(12) United States Patent
Ryan et al.

(10) Patent No.: US 10,372,730 B2
(45) Date of Patent: *Aug. 6, 2019

(54) TECHNIQUES FOR CROSS REFERENCING DATA

(75) Inventors: Thomas Kevin Ryan, Valley Center, CA (US); Carl Lewis Christofferson, Escondido, CA (US); Neelesh Bansode, Bangalore (IN); Santosh Kumar Singh, Bangalore (IN); Latesh Pant, Bangalore (IN); Ankit Khare, Bangalore (IN)

(73) Assignee: Teradata US, Inc., San Diego, CA (US)

(*) Notice: Subject to any disclaimer, the term of this patent is extended or adjusted under 35 U.S.C. 154(b) by 549 days.

This patent is subject to a terminal disclaimer.

(21) Appl. No.: 12/633,215

(22) Filed: Dec. 8, 2009

(65) Prior Publication Data

US 2011/0137961 A1    Jun. 9, 2011

(51) Int. Cl.
G06F 17/30         (2006.01)
G06F 16/28         (2019.01)

(52) U.S. Cl.
CPC .................. *G06F 16/284* (2019.01)

(58) Field of Classification Search
None
See application file for complete search history.

(56) References Cited

U.S. PATENT DOCUMENTS

| | | | |
|---|---|---|---|
| 7,376,658 B1 * | 5/2008 | Bumgarner et al. | 707/736 |
| 7,437,378 B2 * | 10/2008 | Minium et al. | |
| 7,480,669 B2 | 1/2009 | Lo et al. | |
| 8,195,703 B1 * | 6/2012 | Whistler | 707/796 |
| 2001/0027488 A1 * | 10/2001 | Hodgkin et al. | 709/229 |
| 2006/0184566 A1 | 8/2006 | Lo et al. | |
| 2007/0288212 A1 * | 12/2007 | Messmer et al. | 703/6 |
| 2007/0294307 A1 * | 12/2007 | Chen et al. | 707/200 |
| 2008/0235231 A1 * | 9/2008 | Gass | G06F 21/6227 |
| 2009/0112928 A1 * | 4/2009 | Hoyt et al. | 707/104.1 |
| 2009/0138496 A1 * | 5/2009 | Constanzo | G06F 17/30595 |
| 2009/0282062 A1 * | 11/2009 | Husic | G06F 21/62 |
| 2010/0042922 A1 * | 2/2010 | Bradateanu et al. | 715/711 |
| 2010/0122211 A1 * | 5/2010 | Abernethy et al. | 715/810 |
| 2010/0138256 A1 * | 6/2010 | Manucha | G06Q 10/087 705/28 |

* cited by examiner

*Primary Examiner* — Thu N Nguyen
(74) *Attorney, Agent, or Firm* — James Stover (57) ABSTRACT

Techniques for cross referencing data are presented. A first database object and a second database object are linked together. The linkage is automatically cross referenced to a third database object. Access to any of the database objects can be achieved via any of the remaining database objects and vice versa. Additionally, the link and cross reference can be visualized and visually manipulated and modified.

12 Claims, 11 Drawing Sheets

| DEFINE CROSS REFERENCE | |
|---|---|
| CROSS REFERENCE NAME:* | ITEM_LEGACY_MAINFRA |
| CROSS REFERENCE DESCRIPTION: | LEGACY AND MAINFRAME |
| GOLDEN OBJECT: | ITEM ▶ |
| NO. OF CROSS REFERENCE OBJECT: | 2 ▶ |
| CROSS REFERENCE OBJECT 1: | ITEM MAINFRAME ▶ |
| CROSS REFERENCE OBJECT 2: | ITEM LEGACY ▶ |
| USER DEFINED RELATIONAL OBJECT: | ☐ |

CANCEL  NEXT

*Fig. 4*

| MDM: MANAGE CROSS REFERENCE > DEFINE CROSS REFERENCE > ADDITIONAL ATTRIBUTES | |
|---|---|
| ADDITIONAL ATTRIBUTES | |
| EXISTING STANDARD ATTRIBUTES: | (EFFECTIVE START DATE, EFFECTIVE END DATE, APPROVED BY, COMMENTS, STATUS, APPROVED DATE) |
| DEFINE NEW ADDITIONAL ATTRIBUTES: | ☐ |

BACK  NEXT

*Fig. 5*

| SELECTED GOLDEN OBJECT DETAILS | | | |
|---|---|---|---|
| CROSS REFERENCE NAME: | ITEM_LEGACY_MAINFRAME | | |
| GOLDEN OBJECT NAME: | ITEM | | |
| GOLDEN OBJECT TABLE: | ITEM | | |
| CHILD OBJECTS FOR GOLDEN OBJECT- ITEM | | | |
| CHILD OBJECT NAME | CHILD TABLE NAME | CHILD VIEW NAME | CHILD OBJECT DESCRIPTION |
| ITEMMAINFRAME | ITEMMAINFRAME | | ITEMMAINFRAME |
| ITEMLEGACY | ITEMLEGACY | | ITEMLEGACY |
| | | BACK  VIEW CROSS REFERENCE DATA | DEFINE CROSS REFERENCE DATA |

Fig. 6

SELECTED GOLDEN OBJECT DATA

– ITEM

| ITEM_ID | NAME | DESCRIPTION | DEPT_ID | SOURCE | CREATED_BY | CREATION DATE | ENTITY STATE | LAST MODIFIED BY | LAST MODIFIED DATE |
|---|---|---|---|---|---|---|---|---|---|
| ITEM005 | TROUSER1 | TROUSER1 | DEPT003 | BACKEND | ADMIN | 11/18/2008 20:32:00:000 | ACTIVE | | |

[JUMP]

SEARCH

– SEARCH ITEM MAINFRAME

| ITEM CODE | ITEM NAME | ITEM DESC | SOURCE | CREATED_BY | CREATION DATE | ENTITY STATE |
|---|---|---|---|---|---|---|
| | | | | | | |

[SHOW ALL] [SEARCH]

[JUMP]

SELECT CROSS REFERENCE OBJECT DATA (1-2)

– ITEM MAINFRAME: PAGE 1 OF 1

| | ITEM CODE | ITEM NAME | ITEM DESC | SOURCE | CREATED_BY | CREATION DATE | ENTITY STATE | LAST MODIFIED BY | LAST MODIFIED DATE |
|---|---|---|---|---|---|---|---|---|---|
| ☐ | MF_ITEM_007 | NAILS | NAILS | BACKEND | ADMIN | 11/18/2008 20:32:00:000 | ACTIVE | | |
| ☑ | MF_ITEM_005 | TROUSER1 | TROUSER1 | BACKEND | ADMIN | 11/18/2008 20:32:00:000 | ACTIVE | | |
| ☐ | MF_ITEM_003 | APPLES | APPLES | BACKEND | ADMIN | 11/18/2008 20:32:00:000 | ACTIVE | | |
| ☐ | MF_ITEM_006 | HAMMER | HAMMER | BACKEND | ADMIN | 11/18/2008 20:32:00:000 | ACTIVE | | |
| ☐ | MF_ITEM_001 | CHICKEN | CHICKEN | BACKEND | ADMIN | 11/18/2008 20:32:00:000 | ACTIVE | | |
| ☐ | MF_ITEM_002 | MILK | MILK | BACKEND | ADMIN | 11/18/2008 20:32:00:000 | ACTIVE | | |
| ☐ | MF_ITEM_004 | SHIRT1 | SHIRT1 | BACKEND | ADMIN | 11/18/2008 20:32:00:000 | ACTIVE | | |

[JUMP]

[BACK] [NEXT CROSS REFERENCE OBJECT]

Fig. 7

| VIEW ADDITIONAL ATTRIBUTES' VALUES | |
|---|---|
| CROSS REFERENCE NAME: | ITEM_LEGACY_MAINFRAME |
| CROSS REFERENCE DESCRIPTION: | LEGACY AND MAINFRAME |
| APPROVED BY: | |
| COMMENTS: | |
| STATUS: | |
| APPROVED DATE: | 11/18/2008 |
| EFFECTIVE START DATE: | 11/18/2008 |
| EFFECTIVE END DATE: | 11/18/2008 |

SAVE  CANCEL

*Fig. 8*

| SELECTED GOLDEN OBJECT DETAILS | | |
|---|---|---|
| CROSS REFERENCE NAME: ITEM_LEGACY_MAINFRAME | | |
| GOLDEN OBJECT NAME: ITEM | | |
| GOLDEN OBJECT TABLE: ITEM | | |
| CHILD OBJECTS FOR GOLDEN OBJECT - ITEM | | |
| CHILD OBJECT NAME | CHILD TABLE NAME | CHILD VIEW NAME | CHILD OBJECT DESCRIPTION |
| ITEMMAINFRAME | ITEMMAINFRAME | | ITEMMAINFRAME |
| ITEMLEGACY | ITEMLEGACY | | ITEMLEGACY |
| | | BACK  VIEW CROSS REFERENCE DATA  DEFINE CROSS REFERENCE DATA |

Fig. 9

SELECTED GOLDEN OBJECT DATA

– ITEM

| ITEM_ID | NAME | DESCRIPTION | DEPT_ID | SOURCE | CREATED_BY | CREATION_DATE | ENTITY_STATE | LAST_MODIFIED_BY | LAST_MODIFIED_DATE |
|---|---|---|---|---|---|---|---|---|---|
| ITEM005 | TROUSER1 | TROUSER1 | DEPT003 | BACKEND | ADMIN | 11/18/2008 20:32:00:000 | ACTIVE | | |

[ JUMP ]

CROSS REFERENCED OBJECT DATA

– ITEM MAINFRAME

| ITEM_CODE | ITEM_NAME | ITEM_DESC | SOURCE | CREATED_BY | CREATION_DATE | ENTITY_STATE | LAST_MODIFIED_BY | LAST_MODIFIED_DATE |
|---|---|---|---|---|---|---|---|---|
| MF_ITEM_005 | TROUSER1 | TROUSER1 | BACKEND | ADMIN | 11/18/2008 20:32:00:000 | ACTIVE | | |

[ JUMP ]

– ITEM LEGACY

| PRODUCT_ID | PROD_NAME | PROD_DESC | SOURCE | CREATED_BY | CREATION_DATE | ENTITY_STATE | LAST_MODIFIED_BY | LAST_MODIFIED_DATE |
|---|---|---|---|---|---|---|---|---|
| LEG_ITEM_005 | TROUSER1 | TROUSER1 | BACKEND | ADMIN | 11/18/2008 20:32:00:000 | ACTIVE | | |

[ JUMP ]

[ BACK ]   [ OK ]   [ VIEW ADDITIONAL ATTRIBUTES ]

Fig. 10

| VIEW ADDITIONAL ATTRIBUTES' VALUES | |
|---|---|
| CROSS REFERENCE NAME: | ITEM_LEGACY_MAINFRAME |
| CROSS REFERENCE DESCRIPTION: | LEGACY AND MAINFRAME |
| APPROVED BY: | |
| COMMENTS: | |
| STATUS: | |
| APPROVED DATE: | 11/18/2008 |
| EFFECTIVE START DATE: | 11/18/2008 |
| EFFECTIVE END DATE: | 11/18/2008 |

[BACK] [OK]

TECHNIQUES FOR CROSS REFERENCING DATA

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots, images, and source code as described below and in any drawings hereto: Copyright © 2009, Teradata, Inc. of Miamisburg, Ohio—All Rights Reserved.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals.

The enterprise data can originate from a myriad of sources and even external feeds, but ultimately the goal for the enterprise is that all the data be consolidated, indexed, and related within a central enterprise data warehouse.

A major portion of data warehouse management is defining and managing data relationships. A data relationship is data needed to control an association of one piece of data within the data warehouse with another piece of data within the data warehouse. Often this control requires enforcement of enterprise business processes; some processes are automated and some processes are manual.

Thus, it can be seen that improved techniques for data relationship management are desirable.

SUMMARY

In various embodiments, techniques for cross referencing data are presented. According to an embodiment, a method for cross referencing data is presented. Specifically, . . . .

DETAILED DESCRIPTION

Figure 1:
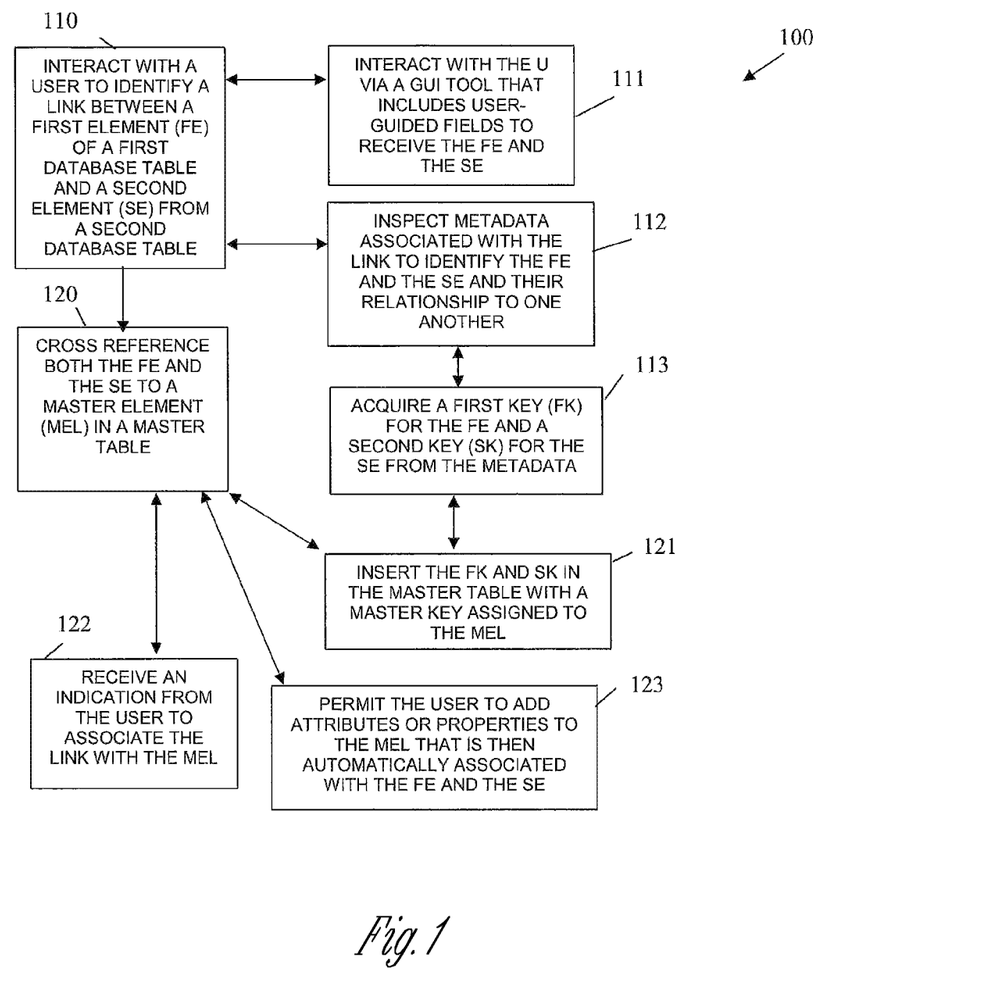
FIG. 1 is a diagram of a method for cross referencing data, according to an example embodiment.

FIG. 1 is a diagram of a method 100 for cross referencing data, according to an example embodiment. The method 100 (hereinafter "data cross-referencing service") is implemented in a machine-accessible or computer-readable storage medium as instructions that is executed by a machine (processing device (processor-enabled with memory; can also be a multiprocessor device) performs the processing depicted in FIG. 1. The machine specifically configured to process the data cross-referencing service. Moreover, the data cross-referencing service is optionally accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by Teradata, Inc. of Miamisburg, Ohio.

The data store includes a variety of enterprise information. One type of information is referred to as an "entity." An entity is something that can be uniquely identified (e.g., a customer account, a customer name, a household name, a logical grouping of certain types of customers, etc.).

The use of "entity" and "element" may be used interchangeably herein and below. Additionally, the use of "data store" and "database" may used interchangeably herein and below.

A table within the data store may include a schema that defines the relationship between one or more elements in the data store. For example, the relationship between data store element "household" to element "individual" and to element "account" (household→individual→account). The schema defines the fields or elements of the data store. The data store includes a plurality of different tables and different schema's. Schema relationships may be hierarchical or many-to-many relationships.

A "relational object" or a "relationship object" is a special grouping of database elements selected and defined by a user. The phrases "database object," "relational object," and "relationship object" may be used interchangeably herein.

Each element or relational object includes attributes and/or properties. Attributes and properties are values associated with an element or object, types of values, metadata about values, and the like. For example, an attribute/property of an element "house" may include a "color type" for the house, such as red. Metadata may indicate the house was painted red on a certain date and by a certain company.

It is also noted that tables can be viewed as "objects" as presented herein and below.

It is within this context that the processing associated with the data cross-referencing service is now described in detail with reference to the FIG. 1.

At 110, the data cross-referencing service interacts with a user to identify a link between a first element of a first database table or first database object and a second element of a second database table or second database object. So, two different database elements are linked to one another via instruction from the user.

According to an embodiment, at 111, the data cross-referencing service interacts with the user via a Graphical User Interface (GUI) tool that includes user-guided fields to receive the first element and the second element to link them together or to receive the link. Some example screen shots of such a GUI tool are provided below with reference to the FIGS. 4-11.

In another case, at 112, the data cross-referencing service inspects metadata associated with the link to identify the first element and the second element and their relationship (linkage) to one another. So, metadata maintained with the link can uniquely identify the first element and the second element.

Continuing with the embodiment of 112 and at 113, the data cross-referencing service acquires a first key for the first element and a second key for the second element from the metadata. The keys are the data components that uniquely identify each particular element and its particular source database table.

At 120, the data cross-referencing service cross references both the first element and the second element to a master element in a master table. The first database table, the second database table, and the master database table are all different from one another.

In an embodiment, which is a continuation of 113 and at 121, the data cross-referencing service inserts the first key and second key in the master table with a master key assigned to the master element. This metadata association of keys provides the cross referencing mechanism.

In another situation, at 122, the data cross-referencing service receives an indication from the user to associate the link with the master element. Thus, the user can instruct the data cross-referencing service to make the cross reference assignment. This can be done via a GUI tool, such as the GUI tool discussed below with reference to the system 300 of the FIG. 3 and the screen shots provided below with the discussion of the FIGS. 4-11.

According to an embodiment, at 123, the data cross-referencing service user to add new attributes or new properties to the master element that is then automatically associated with both the first and second elements. It is noted that the new attributes or new properties may not have been associated with either the first element or the second element.

It is also noted that there can be more then two elements mapped and cross referenced to the master element. The discussion of two elements was presented for purposes of ease of comprehension and illustration only. So, in some cases there can be a third element from a third database table that may be linked to just the first element, just the second element, or both the first and second elements. The third element is also cross referenced with the master element in the master table. This can be expanded to any N elements.

Figure 2:
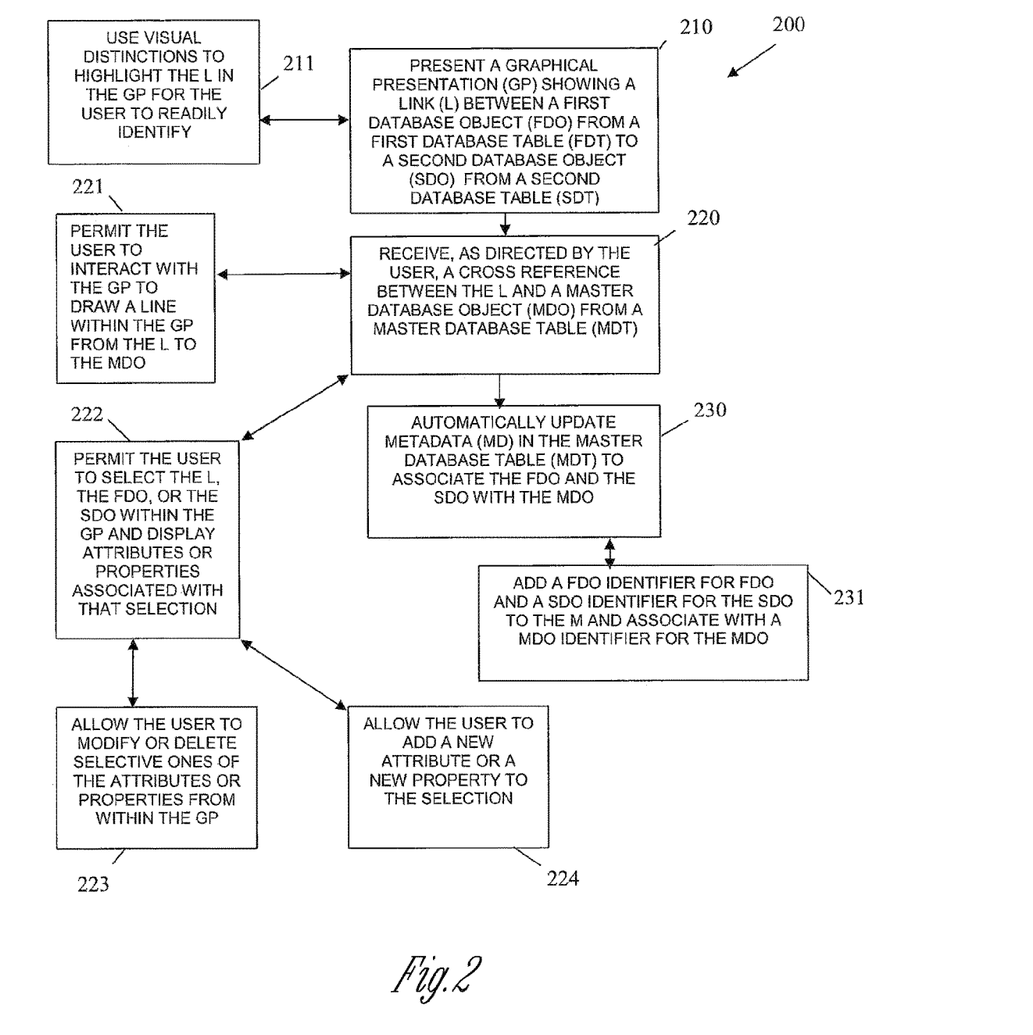
FIG. 2 is a diagram of a method for cross referencing data, according to an example embodiment.

FIG. 2 is a diagram of a method 200 for cross referencing data, according to an example embodiment. The method 200 (hereinafter "cross-referencing service") is implemented in a machine-accessible or a computer-readable storage medium as instructions that are executed by a machine (one or more processors) and perform the processing reflected in FIG. 2. Again, the machine is specifically configured to process the cross-referencing service. The cross-referencing service may also be accessible over a network. The network may be wired, wireless, or a combination of wired and wireless.

The cross-referencing service presents an alternative and in some cases an enhanced processing perspective to the data cross-referencing service represented by the method 100 of the FIG. 1. Specifically, the cross-referencing service provides user interaction with a graphical presentation of data from a database to cross reference data.

At 210, the cross-referencing service presents a graphical presentation showing a link between a first database object from a first database table to a second database object from a second database table. The graphical presentation is the data represented a graph objects, such as boxes, circles, etc. and labeled for user comprehension.

According to an embodiment, at 211, the cross-referencing service uses visual distinctions to highlight the link in the graphical presentation for the user to readily identify. The visual distinctions can include unique colors, unique shapes, unique visual effects, and the like.

At 220, the cross-referencing service receives, as directed by the user, a cross reference between the link and a master database object from a master database table.

In an embodiment, at 221, the cross-referencing service permits the user to interact with the graphical presentation to draw a line within the graphical presentation from the link to the master database object. So, the user, via a selection device, draws on the graphical presentation to establish the cross reference from the link to the master database object.

According to an embodiment, at 222, the cross-referencing service permits the user to select the link, the first database object, or the second database object within the graphical presentation and display attributes or properties associated with that selection. So, the component graphical objects of the graphical presentation can be selected and brought into focus by the user and then information associated therewith presented in a popup window to the user.

Continuing with the embodiment of 222 and at 223, the cross-referencing service allows the user to modify or delete selective ones of the attributes or properties from within the graphical presentation.

Similarly and continuing with the embodiment of 222 and at 224, the cross-referencing service allows the user to add a new attribute or a new property to the selection.

At 230, the cross-referencing service automatically updates metadata in the master database table to associate the first database object and the second database object with the master database object.

In a particular situation, at 231, the cross-referencing service adds a first database object identifier that uniquely identifies the first database object and a second database object identifier that unique identifies the second database object to the metadata. This information is then associated with a master database object identifier that uniquely identifies the master database object.

Figure 3:
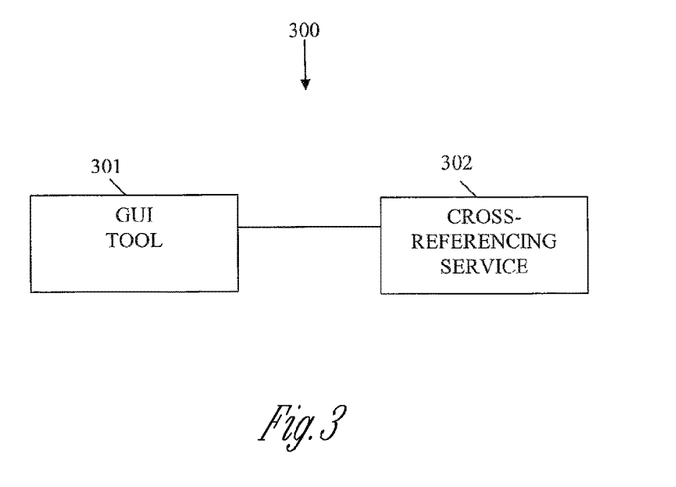
FIG. 3 is a diagram of a data cross referencing system, according to an example embodiment.

FIG. 3 is a diagram of a data cross referencing system 300, according to an example embodiment. The data cross referencing system 300 is implemented in a machine-accessible and/or computer-readable storage medium that is executed by one or more processors and is operational over a network. The network may be wired, wireless, or a combination of wired and wireless.

In an embodiment, portions of the data cross-referencing system 300 implements, among other things the data cross-referencing service and the cross-referencing service represented by the methods 100 and 200 of the FIGS. 1 and 2, respectively.

The data cross referencing system 300 includes a GUI tool 301 and a cross-referencing service 302. Each of these and their interactions with one another will now be discussed in turn.

The GUI tool 301 is implemented in a computer-readable storage medium and is to execute on one or more processors of a network. Example aspects of the GUI tool 301 were presented above with reference to the methods 100 and 200 of the FIGS. 1 and 2, respectively. Moreover, example screen shots of the GUI tool 301 for sample data are provided below with reference to the FIGS. 4-11.

The GUI tool 301 is configured to interact with a user for identifying a link between a first relational object and a second relational object.

According to an embodiment, the first relational object is selected from a first database table and the second relational object is selected from a second database table. The first and second database tables different from one another. The first and second database tables are also different from a master database table having the master database object (discussed below).

In one situation, the GUI tool 301 is further configured to receive indications from the user to cross reference the first relational object and the second relational object with the third relational object.

Additionally, in some cases, the GUI tool 301 is configured to permit the user to modify existing attributes or existing properties associated with the first relational object, the second relational object, and the link.

In still more situations, the GUI tool 301 is configured to permit the user to add new attributes or new properties to the master relational object. The new attributes or new properties are automatically associated with the first relational object and the second relational object on the direction of the user.

In another scenario, the GUI tool 301 is configured to permit the user to add new attributes or new properties to the master relational object. In this scenario, the new attributes or new properties are just associated with the master relational object and not associated with the first relational object and also not associated with the second relational object on the direction of the user.

The cross-referencing service 302 is implemented in a computer-readable storage medium and is to execute on one or more processors of the network. Processing aspects of the cross-referencing service 302 were presented above with reference to the methods 100 and 200 of the FIGS. 1 and 2, respectively.

The cross-referencing service 302 is configured to interface and interact with the GUI tool 301 to identify the link and cross reference the first relational object and the second relational object to a third relational object.

Now an example scenario for cross referencing data according to the teachings presented herein is presented for further illustration.

Assume that in an enterprise, a single item paper is referenced as copying accessories and is also referenced as office stationary. Unless there is a cross system reference maintained and duplicates identified correctly, the enterprise would identify these items uniquely hence resulting in a wrong accounting/reporting.

The techniques presented herein provide a feature where the data cross referencing system identifies and stores such cross references.

| Item Master | |
|---|---|
| Item_ID | Item_Desc |
| 999 | Paper |

| Item Legacy | |
|---|---|
| Item_ID | Item_Desc |
| 777 | Copying Accessories |

| Item MF | |
|---|---|
| Item_ID | Item_Desc |
| 666 | Office Stationary |

| Item CrossReference | |
|---|---|
| Golden_Item_ID | Item_id |
| 999 | 666 |
| 999 | 777 |

The techniques provided herein support the following for cross referencing data:
1. Create, edit, delete of cross reference.
2. Add, edit, delete of cross reference data.
3. Add additional attributes.

FIGS. 4-11 are sample Graphical User Interface (GUI) screens for cross referencing data described in FIGS. 1-3, according to an example embodiment.

Figure 4:
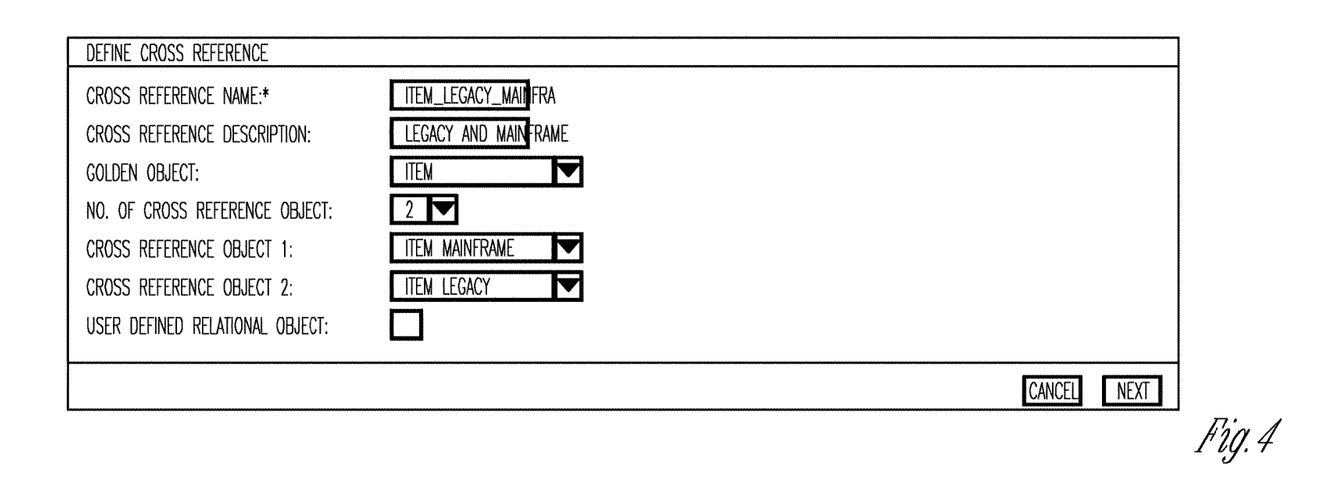
FIGS. 4-11 are sample Graphical User Interface (GUI) screens for cross referencing data described in FIGS. 1-3, according to an example embodiment.

FIG. 4 depicts a GUI tool screen shot for defining a cross reference between objects (master tables) involved. One is a golden master and one or more source tables. Columns are also defined for the source tables, which can be used for value comparisons (matching) and for data linkages.

Figure 5:
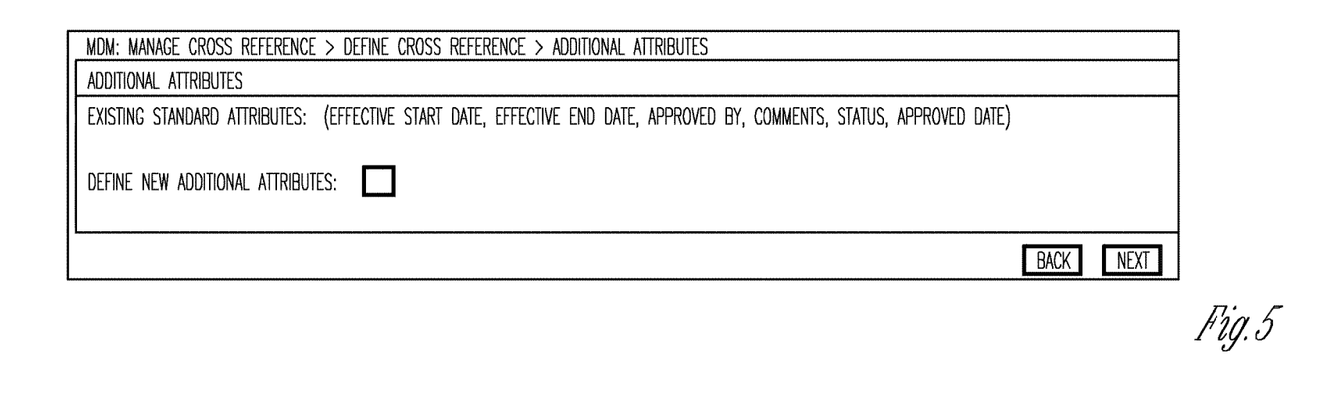

FIG. 5 depicts a GUI tool screen for defining additional attributes for the cross reference defined in the sample depicted in the FIG. 4.

Figure 6:
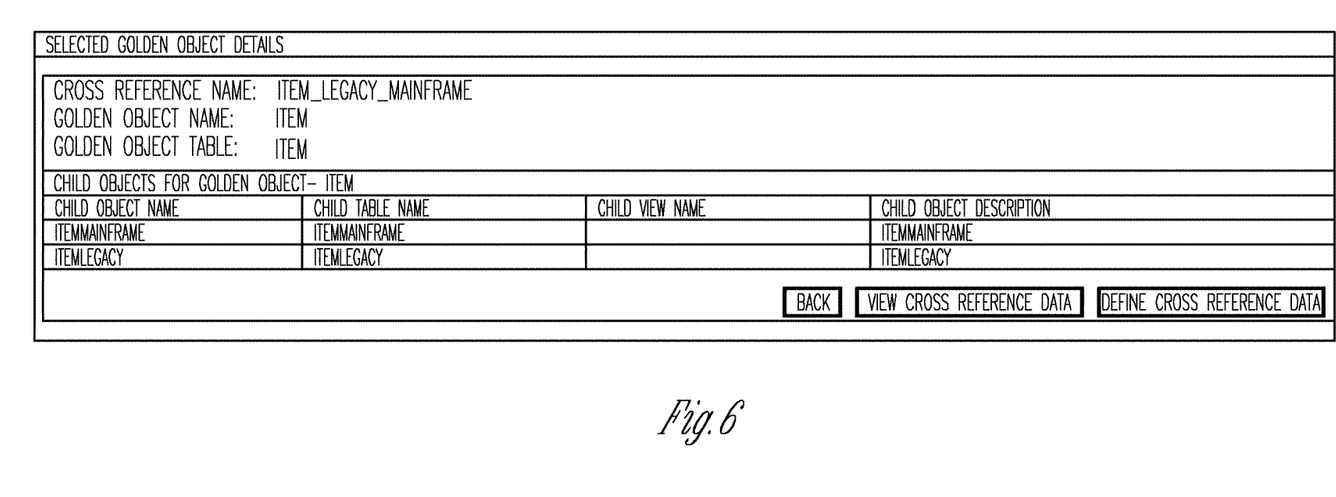

FIG. 6 depicts a GUI tool screen for selecting the golden record and then selecting the record from the source tables and linking them.

Figure 7:
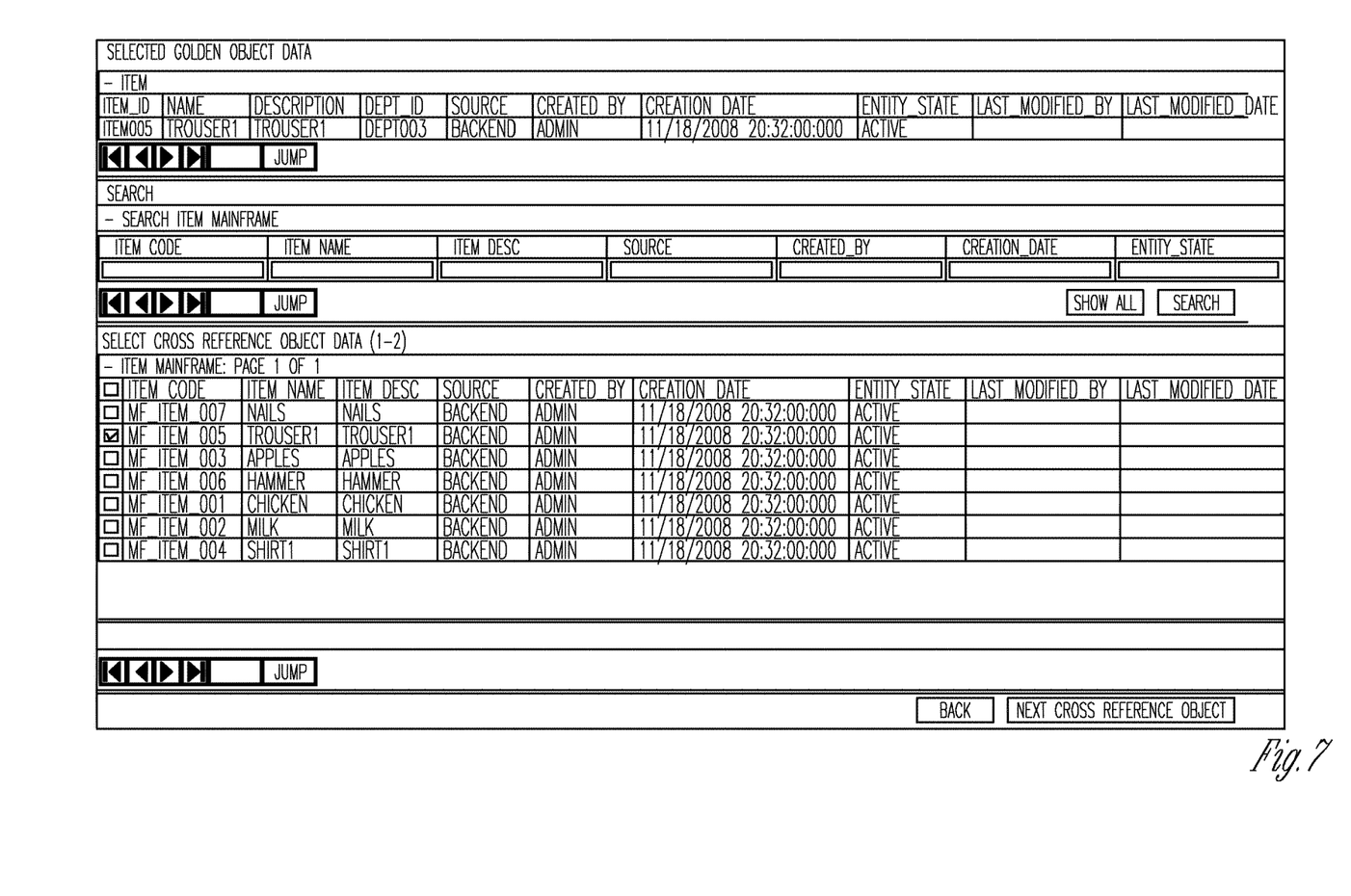

FIG. 7 depicts a GUI tool screen for selecting valid data from the source records and combining the data collected from the various source records and creating a golden record, then linking this to the source records. It is noted that the cross reference can also happen through a record linking User Interface (UI).

Figure 8:
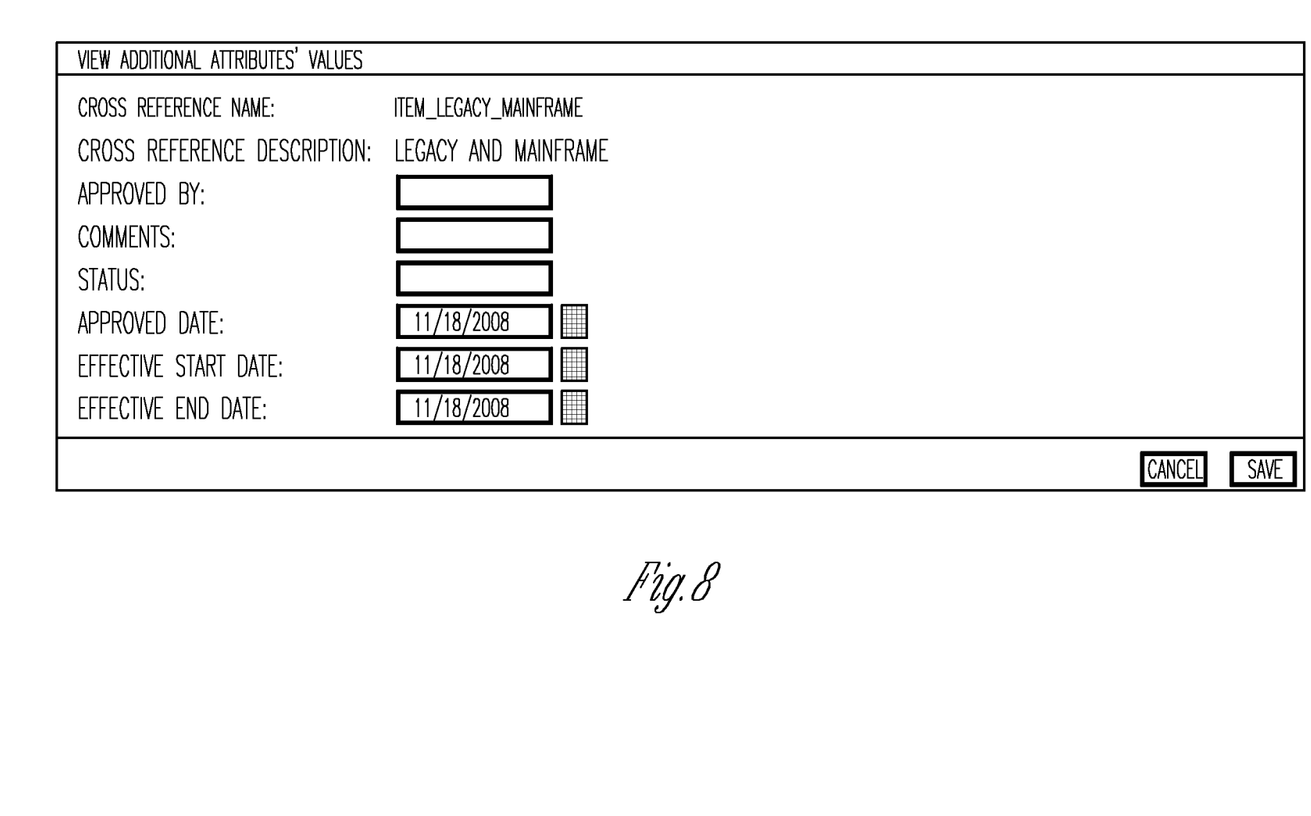

FIG. 8 depicts a GUI tool screen for adding data reflecting additional attribute properties.

Figure 9:
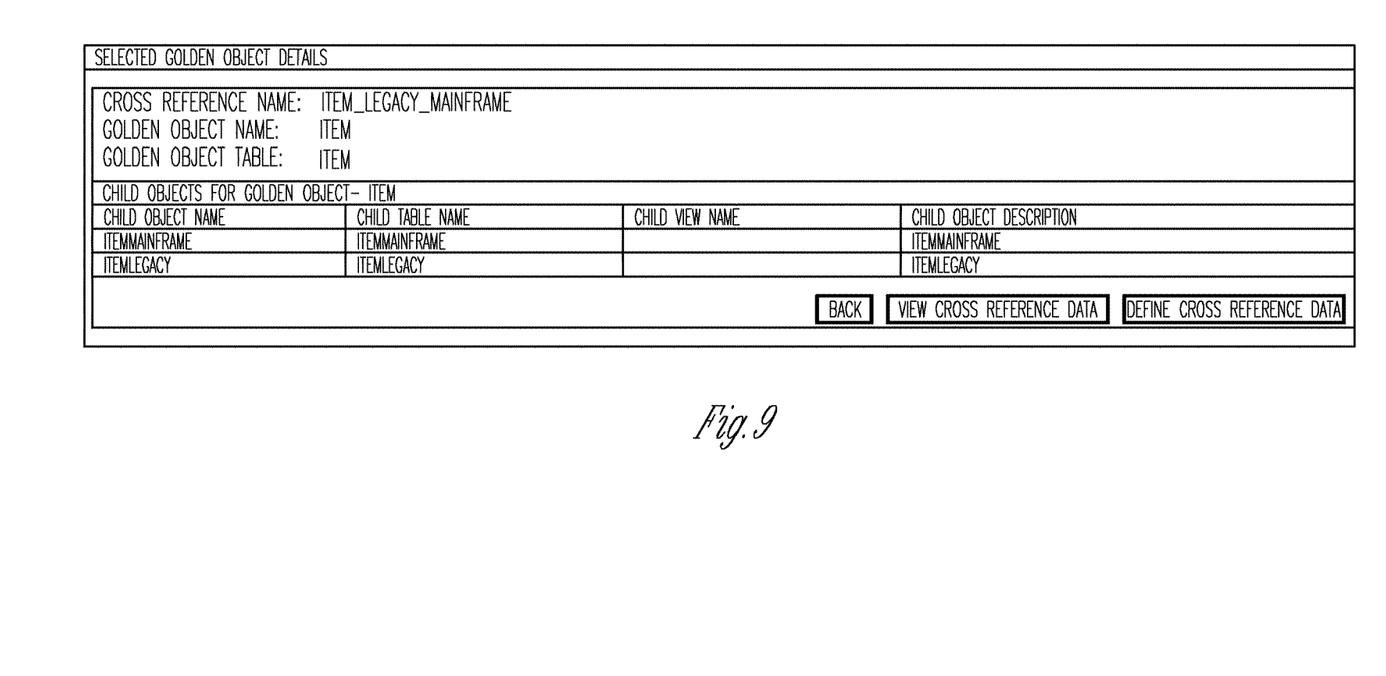

FIG. 9 depicts a GUI tool screen for viewing the cross reference data; here, in the FIG. 9 the cross reference is selected.

Figure 10:
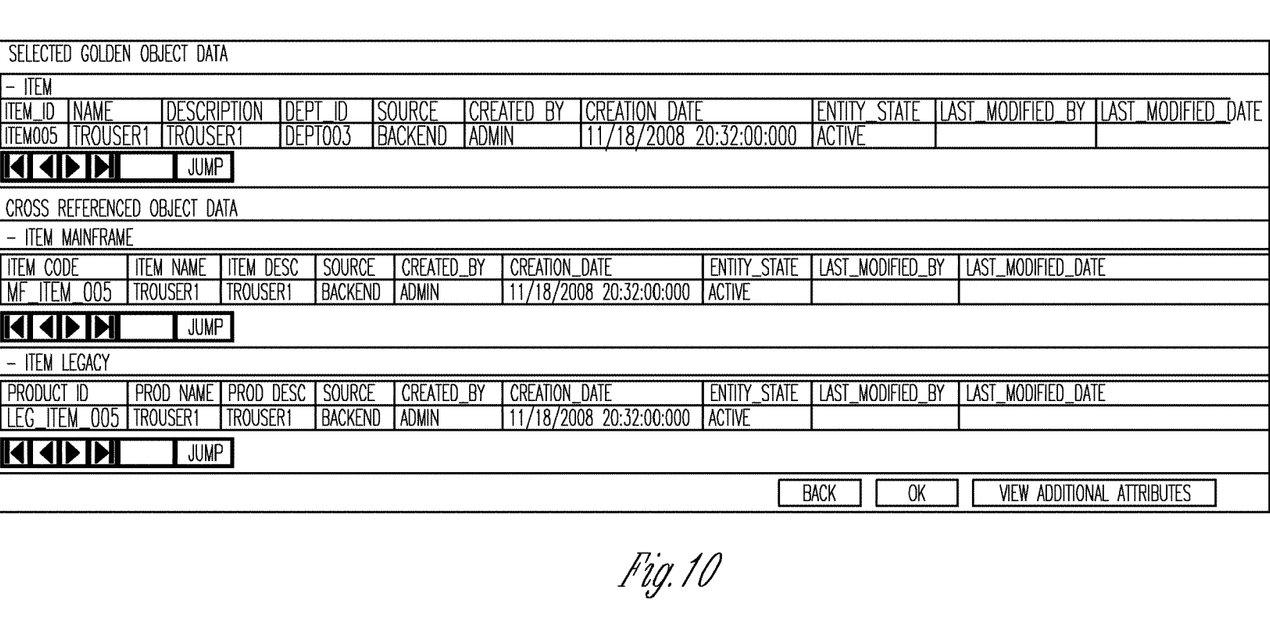

FIG. 10 depicts a GUI tool screen to actually view the data associated with the selected cross reference of the FIG. 9.

Figure 11:
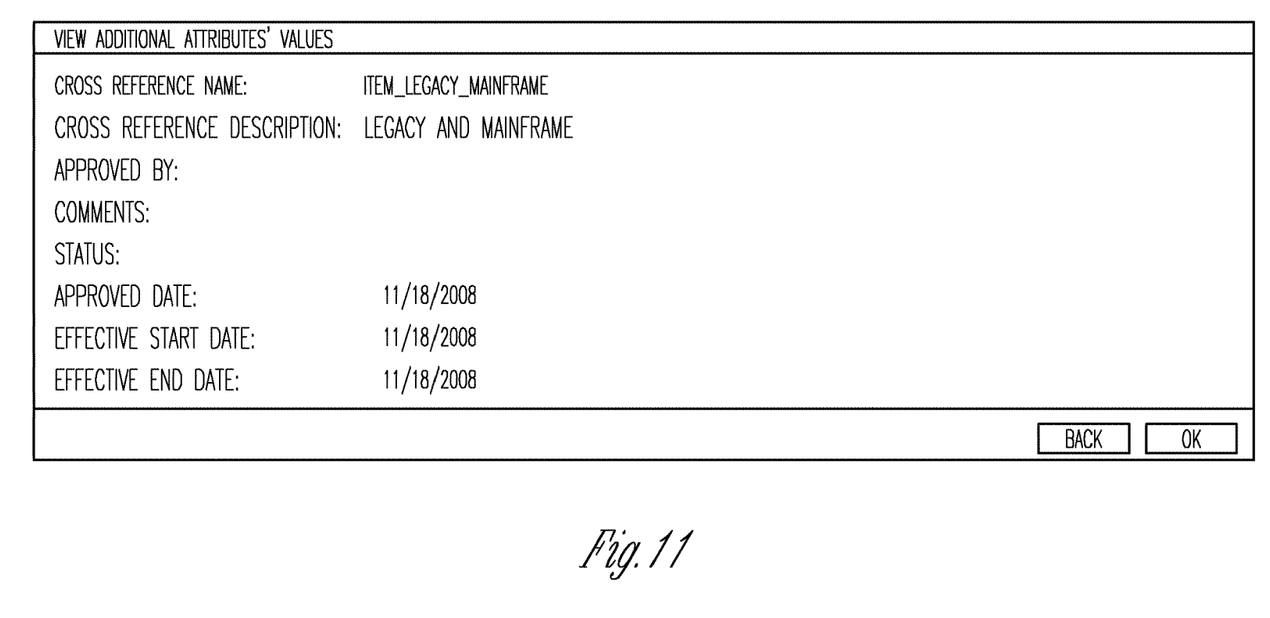

FIG. 11 depicts a GUI tool screen for viewing additional attributes of the cross reference selected in the FIG. 9.

Figure 12:
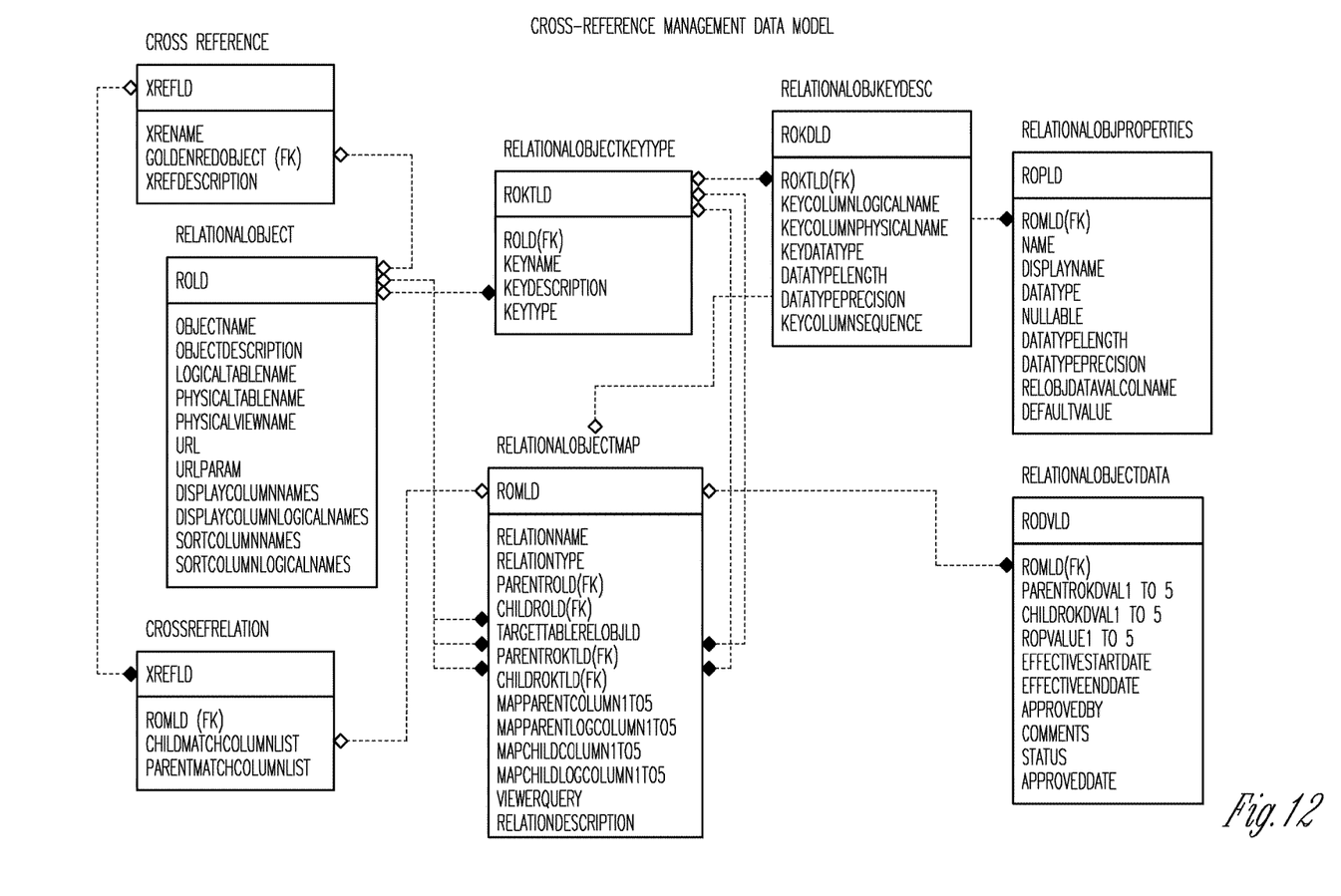
FIG. 12 is a relationship data model for a data cross referencing system, according to an example embodiment.

FIG. 12 is a relationship data model for a data cross referencing system, according to an example embodiment.

The Cross Reference table contains all the cross reference details along with its golden table. XREF REF Rel table contains the various relationships that would constitute a cross reference.

Now some example source code that can be used to implemented portions of the techniques presented herein are presented. It is noted that other implementations that achieve the teachings presented herein and above can be used without departing from the embodiments of the invention. The sample JAVA® code is used to populate cross reference tables.

Java Class Application Programming Interface (API) Code Sample:

```
public class CrossReferenceOperations
{
public static XMLform createCrossReference(XMLform crossReferenceInformation, OmxContext context)
    {
        //This Method will call addCrossReference( ) to populate cross ref //and cross ref relation table.
    }
```

-continued

```
private static
String addCrossReference(XMLform goldenObjectForm,String
strGoldenRoId,OmxContext context)
{
    //This will insert Record in CrossReference and return Cross
    //Reference Id.
}
private static
XMLform addRelationalObjectMap(String sROMID ,String
sParentRoId,String sChildRoId,String sRelationName,XMLform
additionalAttributeForm,String strXRefId,OmxContext context)
{
    //This will add one record in ROM in case of cross reference
    //creation
}
private static
XMLform addCrossReferenceRelation(String strXRefId,String
sROMID,OmxContext context)
{
    // This will add Record in CrossRefRelation
}
private static XMLform add RelationalObjectProperties(XMLform
additionalAttributeForm,String sROM_ID,OmxContext context)
{
    //This will insert Record in RelationalObjectProperties for Cross
    //Reference creation
}
private static String generateId(String strSequenceName ,OmxContext
context)
{
    //This will generate Sequence Id for a given sequence name
    from
    // ID_SQR Table
}
private static int getKeyColumnSequenceUsingROKTId(String
sROKTId,OmxContext context)
{
    //This will add Record in CrossRefRelation
}
public static XMLform createCrossReferenceFromUI(XMLform
crossReferenceInformation, OmxContext context)
{
    //This will create cross reference in case of customRodv
}
private static XMLform addRelationalObjectMapFromUI(String sROMID
,String sParentRoId,String sChildRoId,String sRelationName,XMLform
additionalAttributeForm,String strXRefId,OmxContext context,XMLform
goldenObjectMapColumnForm,XMLform
crossReferenceMapColumnXml,XMLform goldenObjectForm)
{
    //This will add one record in ROM in case of cross reference
    //creation for customRodv
}
}
                © Teradata, Inc. 2009
```

One now fully appreciates the improved techniques for cross referencing presented herein and above. Specifically, the techniques presented herein directly integrate the management of cross referencing data. The allows database viewers to view, visualize, and interact with data cross referencing from a single data warehouse, while maintaining automated control of the underlying data of the database.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and executed on a processing device, the method comprising:

interacting, via the processing device, with a user to identify a link between a first element of a first database table, a second element from a second database table, and a third element from a third database table, wherein interacting further includes interacting with the user via a Graphical User Interface (GUI) tool that includes user-guided fields to receive the link, the user-guided field represented as graphic shapes, inspecting, by said processing device, metadata associated with the link to identify the first element and the second element and their relationship to one another;

cross referencing, via the processing device, the first element, the second element, and the third element to a master element in a master table; and assigning, via the processing device, a new attribute to the master element, the new attribute is just associated with the master element and is not associated with the first element, the second element, or the third element, the user directing that the new attribute not be associated with the first, second, and third elements and their respective tables, and assigning additional attributes to the master element, by the user through the GUI tool, the additional attributes including an effective start date and an effective end date, and permitting interaction by the user with the GUI tool to edit table attributes for the first element, the second element, and the third element through access to the master element within the GUI tool.

2. The method of claim 1, wherein inspecting further includes acquiring a first key for the first element and a second key for the second element from the metadata.

3. The method of claim 2, wherein cross referencing further includes inserting the first and second keys in the master table with a master key assigned to the master element.

4. The method of claim 1, wherein cross referencing further includes receiving an indication from the user to associate the link with the master element.

5. The method of claim 1, wherein cross referencing further includes permitting the user to add properties to the master element that is then automatically associated with the first and second elements.

6. A method implemented in a computer-readable storage medium and executed by a processor, the method comprising:

presenting, via the processor, a graphical presentation showing a link between a first database object from a first database table to a second database object from a second database table and to a third database object from a third database table, each of the objects represented as graph objects within the graphical presentation;

receiving, by the processor as directed by a user, a cross reference between the link and a master database object from a master database table;

automatically updating, by the processor, metadata in the master database table to associate the first database object, the second database object, and the third database object with the master database object; and assigning, via the processing, a new attribute to the master database object, the new attribute is just associated with the master database object and is not associated with the first database object, the second database object, or the third database object, the user directing that the new attribute not be associated with the first, second, and third objects and their respective tables, and assigning, from the user, an additional attribute to the master database object, the additional attribute includes: an approved by value, an approved date, and a status, and permitting interaction from the user to edit table attributes for the first database object, the second database object, and the third database object through access to the master database element.

7. The method of claim 6, wherein presenting further includes using visual distinctions to highlight the link in the graphical presentation for the user to readily identify.

8. The method of claim 6, wherein receiving further includes permitting the user to interact with the graphical presentation to draw a line within the graphical presentation from the link to the master database object.

9. The method of claim 6, wherein receiving further includes permitting the user to select the link, the first database object, or the second database object within the graphical presentation and displaying attributes or properties associated with that selection.

10. The method of claim 9, wherein permitting further includes allowing the user to modify or delete selective ones of the attributes or properties from within the graphical presentation.

11. The method of claim 9, wherein permitting further includes allowing the user to add a new attribute or a new property to the selection.

12. The method of claim 6, wherein automatically updating further includes adding a first database object identifier for the first database object and a second database object identifier for the second database object to the metadata and associating with a master database object identifier for the master database object.

* * * * *